US012327529B2

(12) United States Patent
Hyeon et al.

(10) Patent No.: US 12,327,529 B2
(45) Date of Patent: Jun. 10, 2025

(54) DISPLAY APPARATUS AND IMAGE DISPLAYING METHOD THEREOF

(71) Applicant: SAMSUNG ELECTRONICS CO., LTD., Suwon-si (KR)

(72) Inventors: Byeongcheol Hyeon, Suwon-si (KR); Dooyoung Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/523,437

(22) Filed: Nov. 29, 2023

(65) Prior Publication Data

US 2024/0144888 A1 May 2, 2024

Related U.S. Application Data

(63) Continuation of application No. PCT/KR2023/013736, filed on Sep. 13, 2023.

(30) Foreign Application Priority Data

Oct. 28, 2022 (KR) ........................ 10-2022-0141480

(51) Int. Cl.
*G09G 3/32* (2016.01)
*G09G 3/34* (2006.01)

(52) U.S. Cl.
CPC ............. *G09G 3/3413* (2013.01); *G09G 3/32* (2013.01); *G09G 2320/0295* (2013.01); *G09G 2320/0646* (2013.01)

(58) Field of Classification Search
CPC ...... G09G 3/3413; G09G 3/32; G09G 3/2077; G09G 2300/0426; G09G 2320/0295; G09G 2300/0452; G09G 2320/0646; G09G 2310/0235; G09G 2330/10
See application file for complete search history.

(56) References Cited

U.S. PATENT DOCUMENTS 7,619,700 B2 11/2009 Hiroki
8,018,405 B2 9/2011 Kwak et al.
(Continued)

FOREIGN PATENT DOCUMENTS

EP 3857602 B1 8/2023
JP 2022-100763 A 7/2022
(Continued)

OTHER PUBLICATIONS

International Search Report (PCT/ISA/210) issued Jan. 4, 2023 by the International Searching Authority in International Patent Application No. PCT/KR2023/013736.
(Continued)

*Primary Examiner* — Dennis P Joseph
(74) *Attorney, Agent, or Firm* — Sughrue Mion, PLLC

(57) ABSTRACT

Provided is a display apparatus that includes a display panel including a plurality of pixels; a driver configured to drive the plurality of pixels based on image data; a controller configured to provide the image data to the driver. The display apparatus is configured to identify a pixel that does not comprise the B light emitting device, from among the plurality of pixels, based on the position information stored in the memory; generate compensated image data for a B light emitting device in at least one adjacent pixel from among the plurality of pixels, that is adjacent with the identified pixel, and for a green (G) light emitting device in the identified pixel; and provide the compensated image data to the driver to display an image frame.

20 Claims, 13 Drawing Sheets

(56) References Cited

U.S. PATENT DOCUMENTS

| | | | | |
|---|---|---|---|---|
| 8,289,264 | B2 | 10/2012 | So et al. | |
| 9,858,886 | B2 | 1/2018 | Bae et al. | |
| 9,927,686 | B2 | 3/2018 | Narikawa | |
| 10,802,388 | B2 | 10/2020 | Narikawa | |
| 2007/0103405 | A1 | 5/2007 | Kwak et al. | |
| 2014/0063468 | A1 | 3/2014 | Narikawa | |
| 2018/0164668 | A1 | 6/2018 | Narikawa | |
| 2021/0049978 | A1* | 2/2021 | Shih | G09G 3/32 |

FOREIGN PATENT DOCUMENTS

| | | | |
|---|---|---|---|
| KR | 10-0662998 | B1 | 12/2006 |
| KR | 10-2008-0085255 | A | 9/2008 |
| KR | 10-2014-0029294 | A | 3/2014 |
| KR | 10-2015-0064469 | A | 6/2015 |
| KR | 10-2016-0040394 | A | 4/2016 |
| KR | 10-2016-0046606 | A | 4/2016 |
| KR | 10-2017-0062575 | A | 6/2017 |
| KR | 10-2018-0014379 | A | 2/2018 |
| KR | 10-2018-0026028 | A | 3/2018 |
| KR | 10-2020-0091347 | A | 7/2020 |
| WO | 2015/190640 | A1 | 12/2015 |

OTHER PUBLICATIONS

Written Opinion (PCT/ISA/237) issued Jan. 4, 2023 by the International Searching Authority in International Patent Application No. PCT/KR2023/013736.

* cited by examiner

DISPLAY APPARATUS AND IMAGE DISPLAYING METHOD THEREOF

CROSS-REFERENCE TO RELATED APPLICATION(S)

This application is a bypass continuation of International Application No. PCT/KR2023/013736, filed on Sep. 13, 2023, which is based on and claims priority to Korean Patent Application No. 10-2022-0141480, filed on Oct. 28, 2022, in the Korean Intellectual Property Office, the disclosures of which are incorporated by reference herein in their entireties.

BACKGROUND

1. Field

The disclosure relates to a display apparatus and an image displaying method thereof.

2. Description of Related Art

A display apparatus may include a display panel, and display an image through the display panel. The display apparatus may include devices of various types such as, for example, and without limitation, a television (TV), a monitor, a smartphone, a tablet, and the like.

Display apparatuses using light-emitting diodes (LEDs) that emit light on its own show advantages in contrast, response time, energy efficiency, and the like.

The LEDs may be included in sub pixels of a plurality of pixels, respectively, and the display apparatus may display an image by emitting light from the LEDs.

SUMMARY

According to an aspect of the disclosure, a display apparatus includes: a display panel comprising a plurality of pixels; a driver configured to drive the plurality of pixels based on image data; a controller configured to provide the image data to the driver, in order to display an image frame on the display panel; a memory storing position information of at least one pixel, from among the plurality of pixels, that does not comprise a blue (B) light emitting device, and at least one instruction; and at least one processor. The at least one processor is configured to execute the at least one instruction to: identify, through the controller, a pixel that does not comprise the B light emitting device, from among the plurality of pixels, based on the position information stored in the memory, generate, through the controller, compensated image data for a B light emitting device in at least one adjacent pixel from among the plurality of pixels, that is adjacent with the identified pixel, and for a green (G) light emitting device in the identified pixel, and provide, through the controller, the compensated image data to the driver.

The at least one processor may be further configured to execute the at least one instruction to: generate the compensated image data such that a brightness of the B light emitting device in the at least one adjacent pixel, and a brightness of the G light emitting device in the identified pixel are increased.

Each of the plurality of pixels may include an electrode pad for a red (R) light emitting device, an electrode pad for a G light emitting device, and an electrode pad for a B light emitting device.

The identified pixel that does not comprise the B light emitting device may include the R light emitting device mounted to the electrode pad for the R light emitting device, and the G light emitting device mounted to the electrode pad for the G light emitting device.

The identified pixel that does not comprise the B light emitting device may include the R light emitting device mounted to the electrode pad for the B light emitting device and the G light emitting device mounted to the electrode pad for the G light emitting device.

The controller may be further configured to provide RGB image data to the driver for driving each of the plurality of pixels, the RGB image data for driving at least one pixel that may include the B light emitting device, from among the plurality of pixels, including B image data in a first section, G image data in a second section, and R image data in a third section.

The memory may be configured to store type information of a pixel, and the at least one processor may be further configured to execute the at least one instruction to: identify, through the controller, whether a type of the identified pixel that does not comprise the B light emitting device is a first type or a second type, based on the type information stored in the memory, and provide, through the controller, the compensated image data to the driver based on the identified type of the identified pixel, where the type of the identified pixel is based on a type of the electrode pad to which the R light emitting device is mounted in the identified pixel.

The at least one processor may be further configured to execute the at least one instruction to: based on identifying the type of the identified pixel that does not comprise the B light emitting device as the first type, provide the RGB image data to the driver for driving the at least one adjacent pixel and the identified pixel, and determine that the identified pixel may include the R light emitting device mounted to the electrode pad for the R light emitting device, the RGB image data for driving the at least one adjacent pixel comprising compensated R image data in a first section, and the RGB image data for driving the identified pixel comprising compensated G image data in a second section.

The at least one processor may be further configured to execute the at least one instruction to: based on identifying the type of the identified pixel that does not comprise the B light emitting device as the second type, provide the RGB image data to the driver for driving the at least one adjacent pixel and the identified pixel, and determine that the identified pixel may include the R light emitting device mounted to the electrode pad for the B light emitting device, the RGB image data for driving the at least one adjacent pixel comprising compensated B image data in a first section, and the RGB image data for driving the identified pixel comprising R image data in a first section and compensated G image data in a second section.

According to an aspect of the disclosure, an image displaying method, for a display panel comprising a plurality of pixels, includes: identifying a pixel that does not comprise a B light emitting device, from among the plurality of pixels, based on position information of the identified pixel; generating compensated image data for a blue (B) light emitting device in at least one adjacent pixel from among the plurality of pixels, that is adjacent with the identified pixel, and image data for a green (G) light emitting device in the identified pixel; and driving the plurality of pixels based on the compensated image data.

The generating the compensated image data may include: increasing a brightness of the B light emitting device in the at least one adjacent pixel, and increasing a brightness of the G light emitting device in the identified pixel.

Each of the plurality of pixels may include an electrode pad for a red (R) light emitting device, an electrode pad for a G light emitting device, and an electrode pad for a B light emitting device.

The identified pixel that does not comprise the B light emitting device may include the R light emitting device mounted to the electrode pad for the R light emitting device, and the G light emitting device mounted to the electrode pad for the G light emitting device.

The identified pixel that does not comprise the B light emitting device may include the R light emitting device mounted to the electrode pad for the B light emitting device and the G light emitting device mounted to the electrode pad for the G light emitting device.

The driving the plurality of pixels based on the compensated image data may include: driving the plurality of pixels based on RGB image data, the RGB image data for driving at least one pixel that may include the B light emitting device, from among the plurality of pixels, comprising B image data in a first section, G image data in a second section, and R image data in a third section.

The method may further include: identifying a type of the identified pixel that does not comprise the B light emitting device as a first type or a second type; and driving the plurality of pixels based on the compensated image data may include driving the plurality of pixels based on the identified type of the identified pixel, where the type of the identified pixel is based on a type of the electrode pad to which the R light emitting device is mounted in the identified pixel.

The method may further include: based on identifying the identified pixel that does not comprise the B light emitting device as the first type, driving the at least one adjacent pixel and the identified pixel based on the RGB image data, and determining that the R light emitting device in the identified pixel is mounted to the electrode pad for the R light emitting device, the RGB image data for driving the at least one adjacent pixel comprising compensated R image data in a first section, and the RGB image data for driving the identified pixel comprising compensated G image data in a second section.

The method may further include: based on identifying the identified pixel that does not comprise the B light emitting device as the second type, driving the at least one adjacent pixel and the identified pixel based on the RGB image data, and determining that the R light emitting device in the identified pixel is mounted to the electrode pad for the B light emitting device, the RGB image data for driving the at least one adjacent pixel comprising compensated B image data in a first section, and the RGB image data for driving the identified pixel comprising R image data in a first section and compensated G image data in a second section.

According to an aspect of the disclosure, a non-transitory computer readable medium stores computer readable program code or instructions which are executable by a processor to perform a method for a display panel comprising a plurality of pixels. The method includes: identifying a pixel that does not comprise a B light emitting device, from among the plurality of pixels, based on position information of the identified pixel; generating compensated image data for a blue (B) light emitting device in at least one adjacent pixel from among the plurality of pixels, that is adjacent with the identified pixel, and image data for a green (G) light emitting device in the identified pixel; and driving the plurality of pixels based on the compensated image data.

The method further may include: identifying a type of the identified pixel that does not comprise the B light emitting device as a first type or a second type, based on a type of the electrode pad to which the R light emitting device is mounted in the identified pixel; and driving the plurality of pixels based on the compensated image data and the identified type of the identified pixel.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
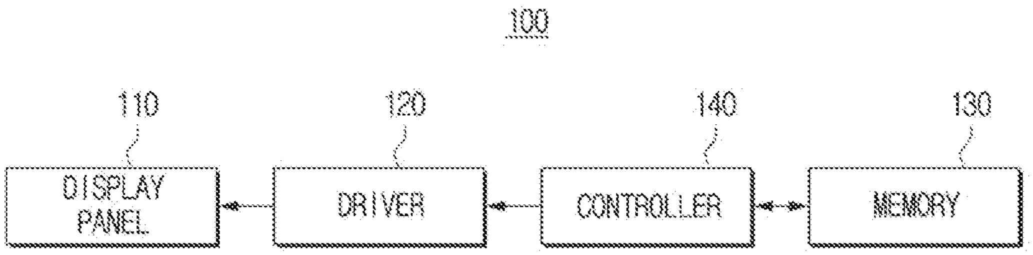
FIG. 1 is a block diagram illustrating a configuration of a display apparatus according to one or more embodiments.

Various modifications may be made to the example embodiments of the disclosure, and there may be various types of embodiments. Accordingly, specific embodiments will be illustrated in drawings, and described in detail in the detailed description. However, it should be noted that the various embodiments are not for limiting the scope of the disclosure to a specific embodiment, and should be interpreted to include all modifications, equivalents or alternatives of the embodiments included in the ideas and the technical scopes disclosed herein. With respect to the description of the drawings, like reference numerals may be used to indicate like elements.

In describing the disclosure, in case it is determined that the detailed description of related known technologies may unnecessarily confuse the gist of the disclosure, the detailed description thereof will be omitted.

Further, the example embodiments below may be modified to various different forms, and it is to be understood that the scope of the technical spirit of the disclosure is not limited to the embodiments below. Rather, the embodiments are provided so that the disclosure will be thorough and complete, and to fully convey the technical spirit of the disclosure to those skilled in the art.

Terms used in the disclosure have been used merely to describe a specific embodiment, and not intended to limit the scope of protection. A singular expression may include a plural expression, unless otherwise specified.

In the disclosure, expressions such as "have," "may have," "comprise," "may comprise," or the like are used to designate a presence of a corresponding characteristic (e.g., elements such as numerical value, function, operation, or component), and not to preclude a presence or a possibility of additional characteristics.

In the disclosure, expressions such as “A or B,” “at least one of A and/or B,” or “one or more of A and/or B” may include all possible combinations of the items listed together. For example, “A or B,” “at least one of A and B,” or “at least one of A or B” may refer to all cases including (1) only A, (2) only B, or (3) both of A and B.

Expressions such as “first,” “second,” “1st,” “2nd,” and so on used herein may be used to refer to various elements regardless of order and/or importance, and it should be noted that the expressions are merely used to distinguish an element from another element and not to limit the relevant elements.

When a certain element (e.g., first element) is indicated as being “(operatively or communicatively) coupled with/to” or “connected to” another element (e.g., second element), it may be understood as the certain element being directly coupled with/to the another element or as being coupled through other element (e.g., third element).

On the other hand, when a certain element (e.g., first element) is indicated as “directly coupled with/to” or “directly connected to” another element (e.g., second element), it may be understood as the other element (e.g., third element) not being present between the certain element and the another element.

The expression “configured to . . . (or set up to)” used in the disclosure may be used interchangeably with, for example, “suitable for . . . ,” “having the capacity to . . . ,” “designed to . . . ,” “adapted to . . . ,” “made to . . . ,” or “capable of . . . ” based on circumstance. The term “configured to . . . (or set up to)” may not necessarily mean “specifically designed to” in terms of hardware.

Rather, in a certain circumstance, the expression “a device configured to . . . ” may mean something that the device “may perform . . . ” together with another device or components. For example, the phrase “a processor configured to (or set up to) perform A, B, or C” may mean a dedicated processor for performing a corresponding operation (e.g., embedded processor), or a generic-purpose processor (e.g., a central processing unit (CPU) or an application processor) capable of performing the corresponding operations by executing one or more software programs stored in a memory device.

The term “module” or “part” used in the embodiments herein perform at least one function or operation, and may be realized with hardware or software, or realized with a combination of hardware and software. Further, a plurality of “modules” or a plurality of “parts,” except for a “module” or a “part” which needs to be realized to a specific hardware, may be integrated to at least one module and realized in at least one processor.

The various elements and areas of the drawings have been schematically illustrated. Accordingly, the technical spirit of the disclosure is not limited by relative sizes and distances illustrated in the accompanied drawings.

One or more embodiments of the disclosure will be described in detail with reference to the accompanying drawings to aid in the understanding of those of ordinary skill in the art, where similar reference characters denote corresponding features consistently throughout.

FIG. 1 is a block diagram illustrating a configuration of a display apparatus according to an embodiment of the disclosure.

Referring to FIG. 1, a display apparatus 100 may include a display panel 110, a driver 120, at least one memory 130, and a controller 140.

The display panel 110 may include a plurality of pixels. The plurality of pixels may be arranged in a matrix form on the display panel 110.

At least one pixel from among the plurality of pixels may not include a blue (B) light emitting device. Further, the remaining pixels may include the B light emitting device.

Specifically, a pixel that includes the B light emitting device may include a red (R) light emitting device, a green (G) light emitting device and the B light emitting device. Here, the light emitting device may be an LED or a micro LED. That is, the display panel 110 may be an LED display panel. The LED display panel may provide better contrast, response time, and energy efficiency compared to a liquid crystal display (LCD) panel that requires a backlight.

A pixel may include a plurality of sub pixels. The plurality of sub pixels may include 3 types of sub pixels such as a R sub pixel, a G sub pixel, and a B sub pixel.

Each sub pixel may include a light emitting device and a driving circuit for driving the light emitting device. The driving circuit may be formed of a transistor, a capacitor, and the like.

That is, the R sub pixel may include the R light emitting device and the driving circuit for driving the R light emitting device, the G sub pixel may include the G light emitting device and the driving circuit for driving the G light emitting device, and the B sub pixel may include the B light emitting device and the driving circuit for driving the B light emitting device.

In addition, the driving circuit may be coupled to an electrode pad. Further, the light emitting device may be mounted to the electrode pad, and coupled with the driving circuit through the electrode pad.

When the light emitting device is mounted to the electrode pad, the light emitting device may be mounted to the electrode pad corresponding thereto.

Specifically, each pixel may include a plurality of electrode pads. The plurality of electrode pads may include an electrode pad for the B light emitting device, an electrode pad for the G light emitting device, and an electrode pad for the R light emitting device.

The electrode pad for the B light emitting device may be an electrode pad coupled to a first driving circuit. Here, the first driving circuit may be a driving circuit set to receive input of data voltage corresponding to image data obtained from a first section of RGB image data.

The electrode pad for the G light emitting device may be an electrode pad coupled to a second driving circuit. Here, the second driving circuit may be a driving circuit set to receive input of data voltage corresponding to image data obtained from a second section of RGB image data.

The electrode pad for the R light emitting device may be an electrode pad coupled to a third driving circuit. Here, the third driving circuit may be a driving circuit set to receive input of data voltage corresponding to image data obtained from a third section of RGB image data.

The RGB image data may have a data structure which is defined according to a predetermined protocol. Accordingly, B image data may be included in the first section of the RGB image data, G image data may be included in the second section of the RGB image data, and R image data may be included in the third section of the RGB image data.

Figure 2:
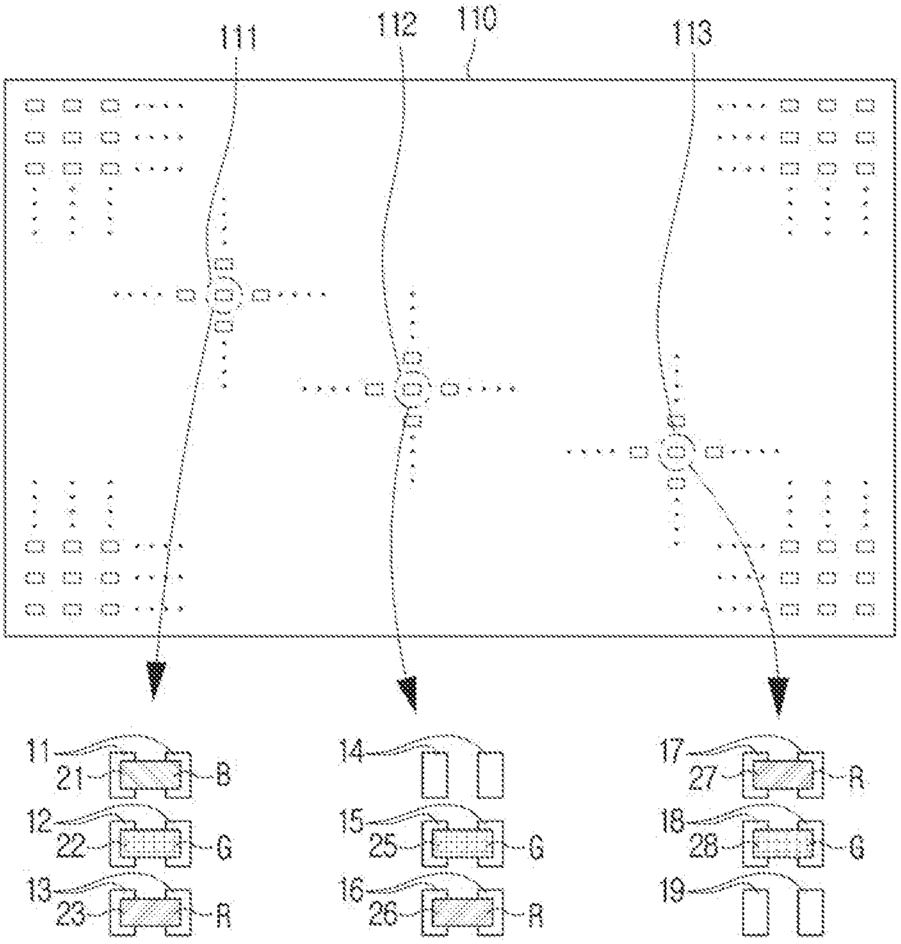
FIG. 2 is a diagram illustrating a pixel of a display panel according to one or more embodiments.

FIG. 2 is a diagram illustrating a pixel of a display panel according to an embodiment.

Referring to FIG. 2, a pixel 111 which includes the B light emitting device in the display panel 110 may include a B light emitting device 21 mounted to an electrode pad for the B light emitting device 11, a G light emitting device 22 mounted to an electrode pad for the G light emitting device 12, and a R light emitting device 23 mounted to an electrode pad for the R light emitting device 13.

A pixel that does not include the B light emitting device may include the R light emitting device and the G light emitting device. That is, the pixel that does not include the B light emitting device may include two types of sub pixels such as the R sub pixel and the G sub pixel.

For example, in a manufacturing process of the display panel 110, a defect in an electrode pad may occur. In this case, even if a light emitting device is mounted to the electrode pad which is defective, the light emitting device may not be normally driven. The defective electrode pad may be replaced with another electrode pad, but additional costs may occur as a result therefrom.

If a defective electrode pad is present in the display panel 110, a light emitting device may not be mounted to the defective electrode pad. However, by compensating brightness of at least one of a pixel included with the defective electrode pad and a pixel adjacent therewith, visibility for the sub pixel that includes the defective electrode pad may be lowered.

For example, the two types of electrode pads, that is, the electrode pad for the B light emitting device and the electrode pad for the R light emitting device may be defective.

If the electrode pad for the B light emitting device is defective, the B light emitting device may not be mounted on the defective electrode pad for the B light emitting device during the manufacturing process of the display panel 110. Accordingly, referring to FIG. 2, a pixel 112 that does not include the B light emitting device in the display panel 110 may include a G light emitting device 25 mounted to an electrode pad for the G light emitting device 15 and a R light emitting device 26 mounted to an electrode pad for the R light emitting device 16. The light emitting device may not be mounted to an electrode pad for the B light emitting device 14.

If the electrode pad for the R light emitting device is defective, the R light emitting device may not be mounted to the defective electrode pad for the R light emitting device during the manufacturing process of the display panel 110. The R light emitting device may be mounted to the electrode pad for the B light emitting device. That is, the B light emitting device may not be mounted to the electrode pad for the B light emitting device, and the R light emitting device may be mounted. Accordingly, referring to FIG. 2, a pixel 113 that does not include the B light emitting device in the display panel 110 may include a R light emitting device 27 mounted to an electrode pad for the B light emitting device 17 and a G light emitting device 28 mounted to an electrode pad for the G light emitting device 18. The light emitting device may not be mounted to an electrode pad for the R light emitting device 19.

As described above, the R light emitting device in the pixel that does not include the B light emitting device may be mounted to the electrode pad for the R light emitting device or the electrode pad for the B light emitting device.

In FIG. 2, sub-pixels are arranged in the order of B sub-pixels (e.g., B light emitting devices), G sub-pixels (e.g., G light emitting devices), and R sub-pixels (e.g., R light emitting devices) in one pixel area as an example. However, the embodiment is not limited thereto, and the B sub pixel, the G sub pixel, and the R sub pixel may be arranged in various forms according to embodiments.

The display panel 110 may include at least one pixel that does not include the B light emitting device.

In this case, the R light emitting device in the at least one pixel that does not include the B light emitting device may be mounted to the electrode pad for the R light emitting device. Alternatively, the R light emitting device in the at least one pixel that does not include the B light emitting device may be mounted to the electrode pad for the B light emitting device. Alternatively, the R light emitting device in some pixels from among the at least one pixel that does not include the B light emitting device may be mounted to the electrode pad for the R light emitting device, and the R light emitting device from the remaining pixels may be mounted to the electrode pad for the B light emitting device.

The driver 120 may drive the display panel 110 based on image data.

For example, gate lines and data lines may be arranged in the display panel 110, and a plurality of pixels may be formed at areas at which the gate lines and the data lines are crossed.

The driver 120 may sequentially provide scan signals to the gate lines. Then, the driver 120 may convert image data to data voltage in an analog form, and apply the data voltage to sub pixels selected by the scan signals through the data lines.

In this case, the driving circuit included in each of the sub pixels may drive the light emitting device coupled to the driving circuit through the electrode pad using data voltage. For example, the driving circuit may control light emitting time of the light emitting device or control an amplitude of current that is provided to the light emitting device by using data voltage, and express a grayscale of light that is emitted from the light emitting device.

The memory 130 may be stored with position information of at least one pixel that does not include the B light emitting device from among the plurality of pixels.

Here, the position information may indicate a position of the pixel that does not include the B light emitting device in the display panel 110. For example, the position information may be coordinate information. The coordinate information may be set in a format such as (x,y) if a horizontal axis of the display panel 110 is defined as an x-axis and a vertical axis of the display panel 110 is defined as a y-axis.

In addition, the memory 130 may be stored with type information of at least one pixel that does not include the B light emitting device.

Here, a type of pixel may be classified according to a type of electrode pad to which the R light emitting device is mounted in the pixel that does not include the B light emitting device.

For example, the type of pixel may include a first type and a second type.

Specifically, if the type of pixel that does not include the B light emitting device is the first type, the pixel that does not include the B light emitting device may include the R light emitting device mounted to the electrode pad for the R light emitting device. In addition, if the type of pixel that does not include the B light emitting device is the second type, the pixel that does not include the B light emitting device may include the R light emitting device mounted to the electrode pad for the B light emitting device.

As described above, information about the position and type of the pixel that does not include the B light emitting device may be stored in the memory 130, and the information described may be stored in the memory 130 in a manufacturing step of the display apparatus 100.

The controller 140 may display an image frame in the display panel 110 by driving the driver 120.

For example, the controller 140 may control the driver 120 to start a scan according to timing that corresponds to each image frame. Then, the controller 140 may provide image data to the driver 120, and control the driver 120 so that the driver 120 applies data voltage corresponding to the image data to sub pixels according to the scan. The controller 140 described above may be a timing controller (TCON), or include the timing controller, and may perform addition functions in addition to a function of the timing controller.

The controller 140 may compensate image data based on position information stored in the memory 130, and provide the compensated image data to the driver 120.

Specifically, the controller 140 may identify the pixel that does not include the B light emitting device from among the plurality of pixels based on position information stored in the memory 130.

Here, the position information may be coordinate information of the pixel that does not include the B light emitting device in the display panel 110. Accordingly, the controller 140 may identify the pixel that does not include the B light emitting device from among the plurality of pixels of the display panel 110 using coordinate information.

Then, the controller 140 may compensate image data for the B light emitting device included in at least one adjacent pixel adjacent with the identified pixel and image data for the G light emitting device included in the identified pixel.

Specifically, the controller 140 may compensate image data so that brightness of the B light emitting device included in the adjacent pixel and brightness of the G light emitting device included in the identified pixel are increased.

In this case, the controller 140 may compensate B image data for the B light emitting device included in the adjacent pixel by applying a weight value to B image data for the B light emitting device included in the adjacent pixel so that brightness of the B light emitting device included in the adjacent pixel is increased. In addition, the controller 140 may compensate G image data for the G light emitting device in the pixel that does not include the B light emitting device by applying a weight value to G image data for the G light emitting device so that brightness of the G light emitting device in the pixel that does not include the B light emitting device is increased The adjacent pixel may include at least one of a first adjacent pixel, a second adjacent pixel, and a third adjacent pixel.

The first adjacent pixel may include pixels of a predetermined number which are positioned at a left direction and/or a right direction of the pixel that does not include the B light emitting device along a gate line based on the pixel that does not include the B light emitting device.

For example, the first adjacent pixel may include one pixel or two pixels positioned at a left side and/or a right side of the pixel that does not include the B light emitting device. In addition, the first adjacent pixel may include pixels in plurality which are positioned at the left side direction and/or the right side direction based on the pixel that does not include the B light emitting device.

The second adjacent pixel may include pixels of a predetermined number which are positioned at an upper side direction and/or a lower side direction of the pixel that does not include the B light emitting device along a data line based on the pixel that does not include the B light emitting device.

For example, the second adjacent pixel may include one pixel or two pixels positioned at an upper side and/or a lower side of the pixel that does not include the B light emitting device. In addition, the second adjacent pixel may include pixels in plurality which are positioned at the upper side direction and/or the lower side direction based on the pixel that does not include the B light emitting device.

The third adjacent pixel may include pixels of a predetermined number which are positioned at a diagonal direction based on the pixel that does not include the B light emitting device.

For example, the third adjacent pixel may include one pixel, two pixels, three pixels, or four pixels positioned at the diagonal direction of the pixel that does not include the B light emitting device. In addition, the third adjacent pixel may include pixels in plurality which are positioned at the diagonal direction based on the pixel that does not include the B light emitting device.

Information about how many pixels from among the pixels positioned at a surrounding of the pixel that does not include the B light emitting device correspond to an adjacent pixel and a weight value applied to the image data may be pre-stored in the memory 130.

That is, the position and number of adjacent pixels and the weight value applied to the image data may be measured experimentally taking into consideration characteristics of the display panel 110 such as, for example, and without limitation, a pixel pitch, brightness of a light emitting device, a degree of light dispersion in the display panel 110, and the like, and a degree to which a blue color is more brightly visible than an original image due to compensated image data, and the like, and information associated therewith may be stored in the memory 130 during the manufacturing process of the display apparatus 100.

Accordingly, the controller 140 may identify the adjacent pixel for the pixel that does not include the B light emitting device using information stored in the memory 130, and generate compensated image data by applying the weight value to the image data.

FIG. 3A, FIG. 3B, FIG. 4A, FIG. 4B, FIG. 5A, and FIG. 5B are diagrams illustrating a method of controlling brightness of an adjacent pixel and a pixel in which a blue light emitting device is not included according to various embodiments.

Figure 3A:
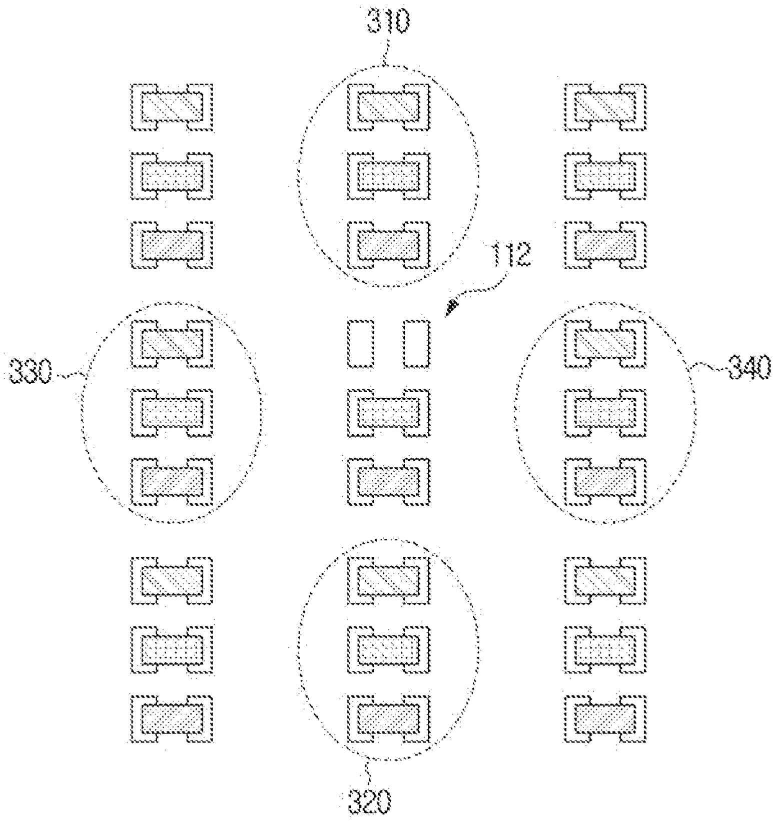
FIG. 3A, FIG. 3B, FIG. 4A, FIG. 4B, FIG. 5A, and FIG. 5B are diagrams illustrating a method of controlling brightness of an adjacent pixel and a pixel in which a blue light emitting device is not included according to various embodiments.

As shown in FIG. 3A, the controller 140 may increase brightness of the G light emitting device in a pixel 112 that does not include the B light emitting device and brightness of the B light emitting device included in each of pixels 310, 320, 330, and 340 positioned at an upper side, a lower side, a left side, and a right side of the pixel 112.

Figure 3B:
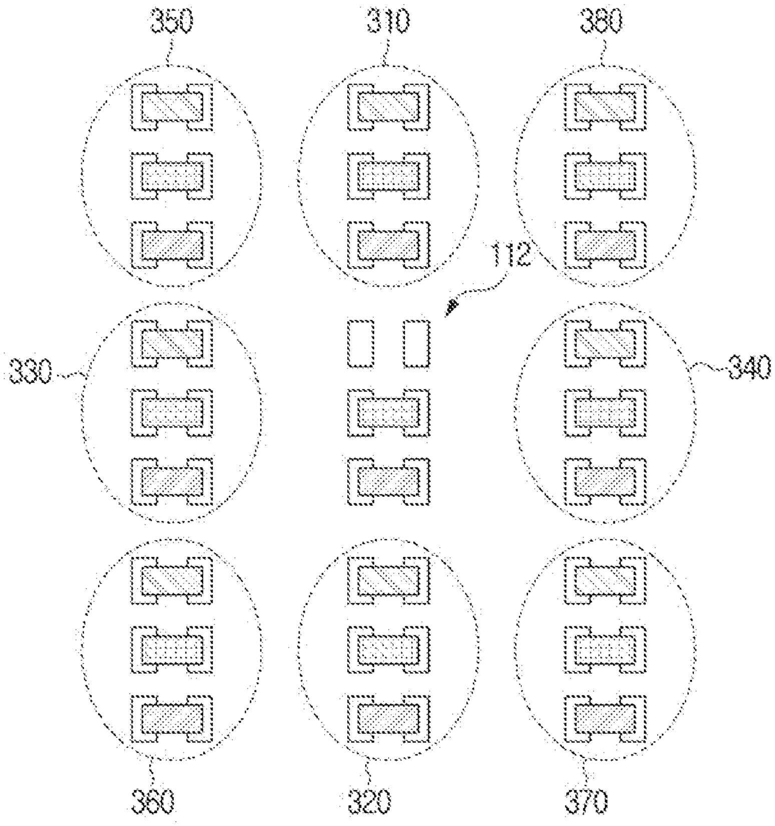

As shown in FIG. 3B, the controller 140 may increase brightness of the G light emitting device in the pixel 112 that does not include the B light emitting device, brightness of the B light emitting device included in each of the pixels 310, 320, 330, and 340 positioned at the upper side, the lower side, the left side, and the right side of the pixel 112, and brightness of the B light emitting device included in each of pixels 350, 360, 370, and 380 positioned at a diagonal direction of the pixel 112.

Figure 4A:
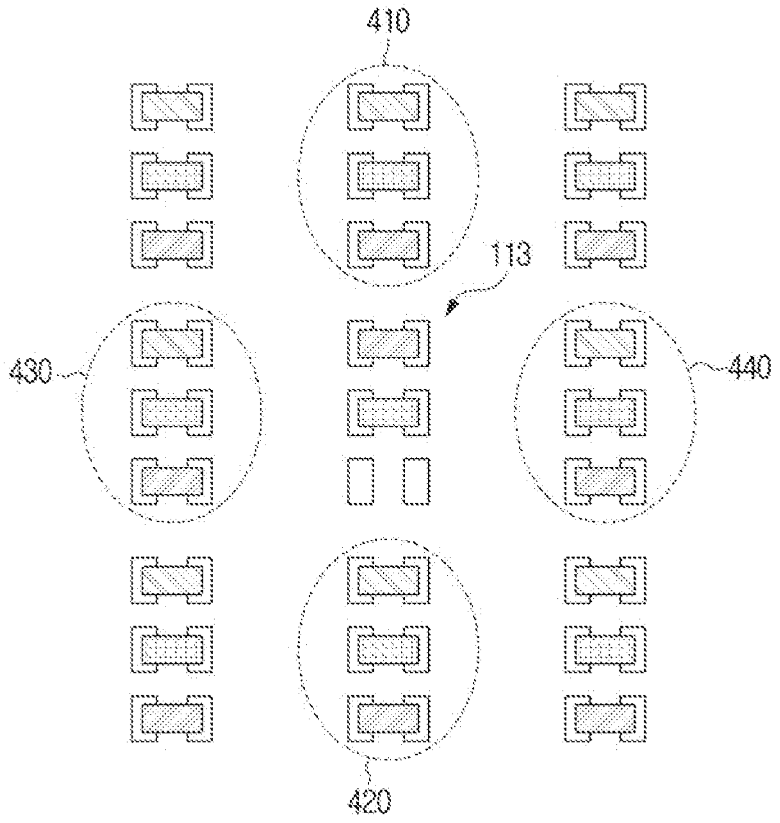

As shown in FIG. 4A, the controller 140 may increase brightness of the G light emitting device in a pixel 113 that does not include the B light emitting device and brightness of the B light emitting device included in each of pixels 410,

420, 430, and 440 positioned at an upper side, a lower side, a left side, and a right side of the pixel 113.

Figure 4B:
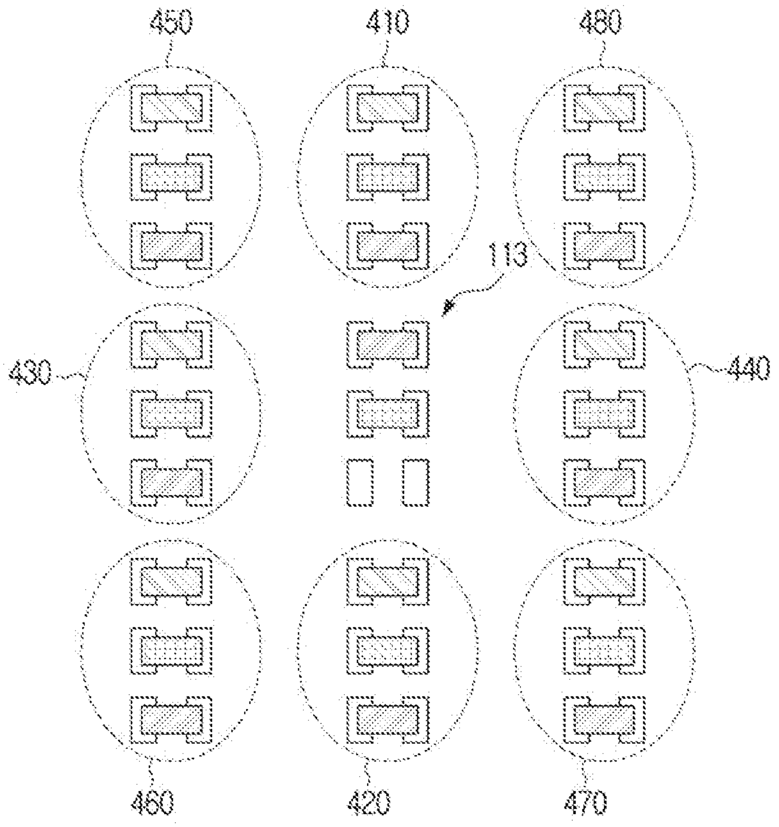

As shown in FIG. 4B, the controller 140 may increase brightness of the G light emitting device in the pixel 113 that does not include the B light emitting device, brightness of the B light emitting device included in each of the pixels 410, 420, 430, and 440 positioned at the upper side, the lower side, the left side, and the right side of the pixel 113, and brightness of the B light emitting device included in each of pixels 450, 460, 470, and 480 positioned at a diagonal direction of the pixel 113.

Figure 5A:
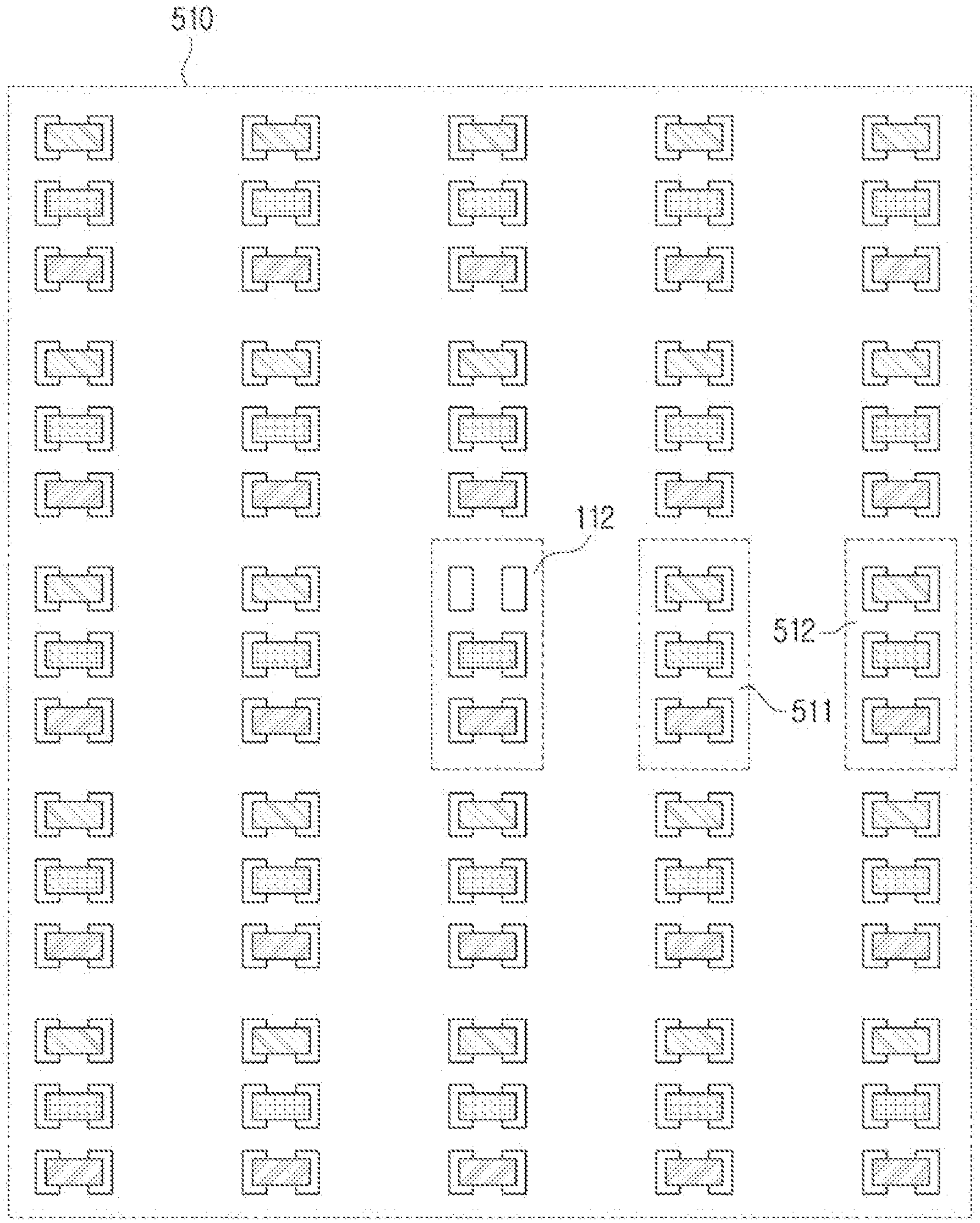
Figure 5B:
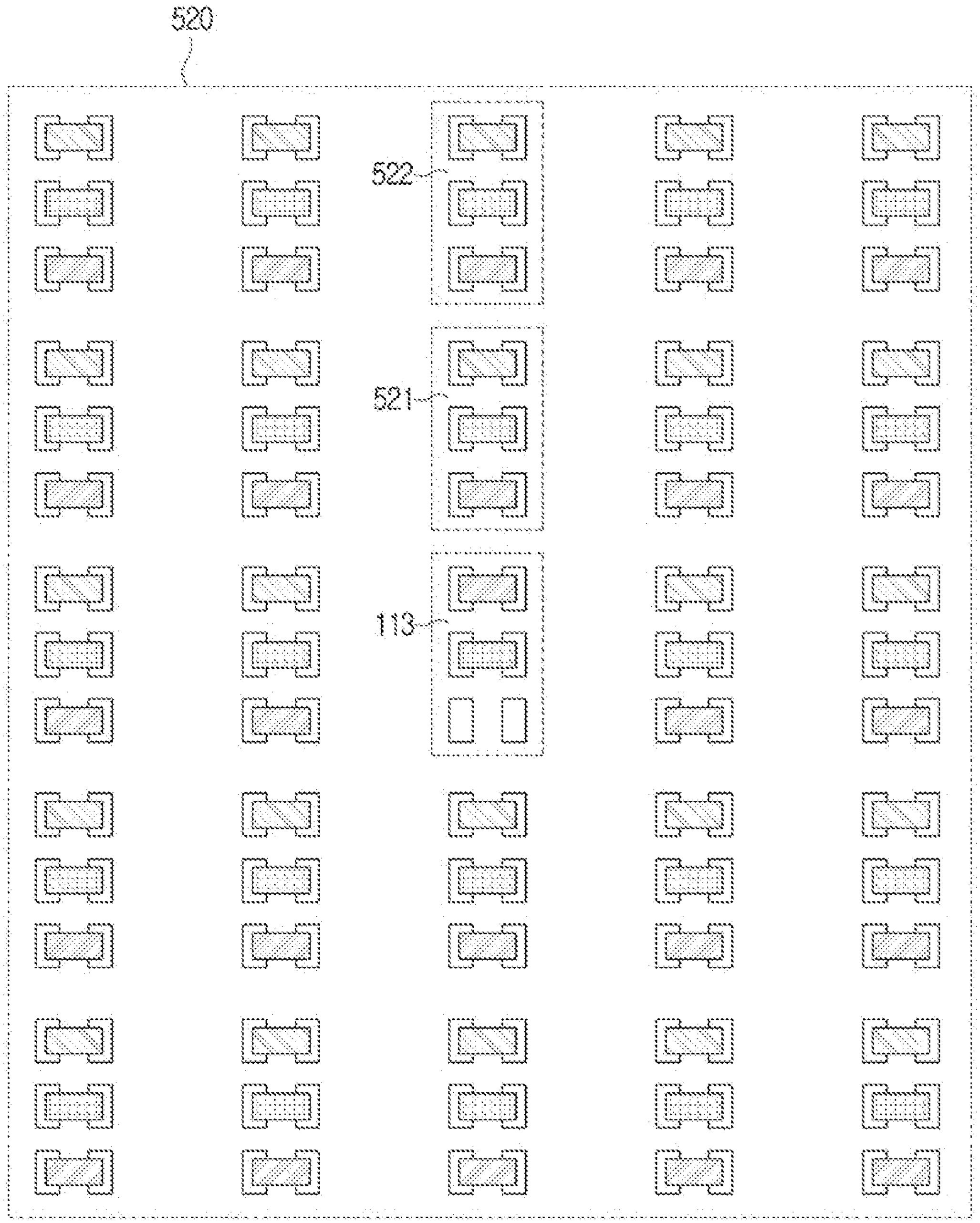

As shown in FIG. 5A and FIG. 5B, the controller 140 may increase brightness of the B light emitting device in a plurality of pixels 510 and 520 which are positioned at each of an upper side direction, a lower side direction, a left side direction, a right side direction and a diagonal direction of the pixels 112 and 113 that do not include the B light emitting device.

In this case, a smaller weight value may be applied to the image data as the distance from the pixels 112 and 113 increase.

For example, a weight value applied to B image data for the B light emitting device in a pixel 511 may be greater than a weight value applied to B image data for the B light emitting device in a pixel 512. In addition, a weight value applied to B image data for the B light emitting device in a pixel 521 may be greater than a weight value applied to B image data for the B light emitting device in a pixel 522.

The controller 140 may provide RGB image data for driving each of the plurality of pixels to the driver 120.

The B image data may be included in the first section of the RGB image data for at least one pixel that includes the B light emitting device from among the plurality of pixels, the G image data may be included in the second section of the RGB image data, and the R image data may be included in the third section of the RGB image data.

Figure 6:
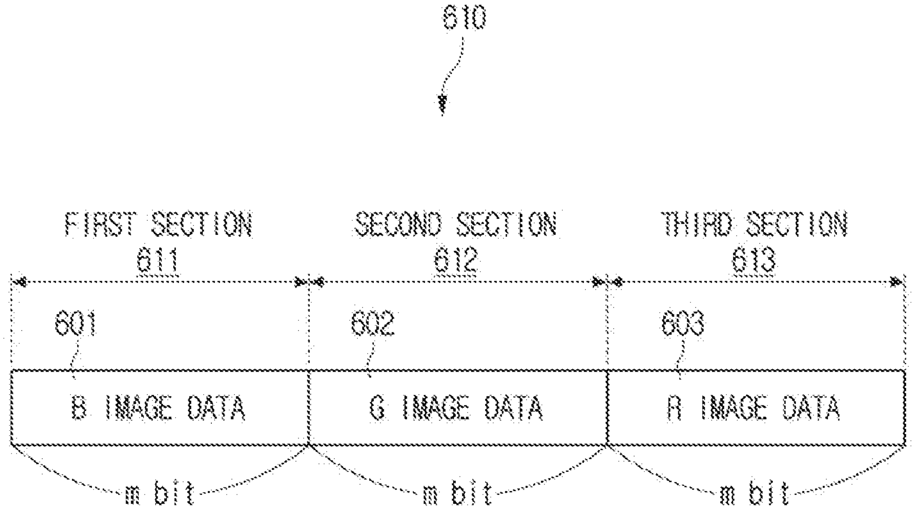
FIG. 6, FIG. 7, and FIG. 8 are diagrams illustrating red (R), green (G), and blue (B) image data (e.g., RGB image data) according to various embodiments.
Figure 7:
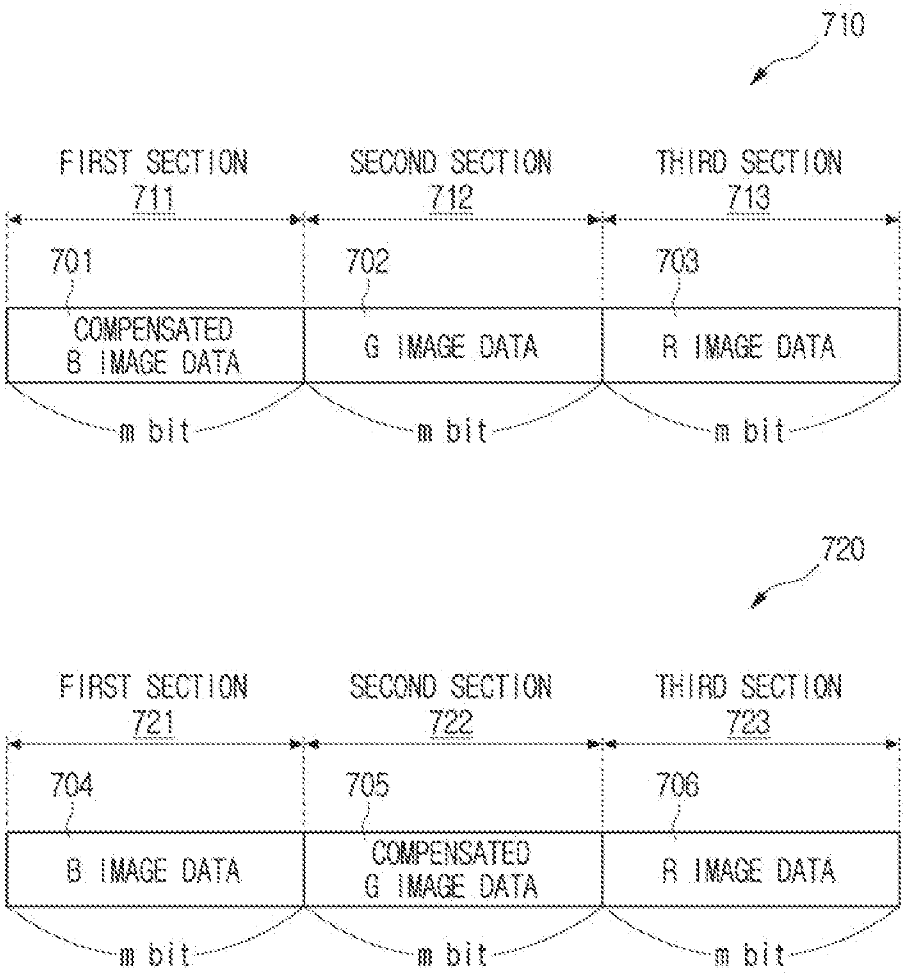
Figure 8:
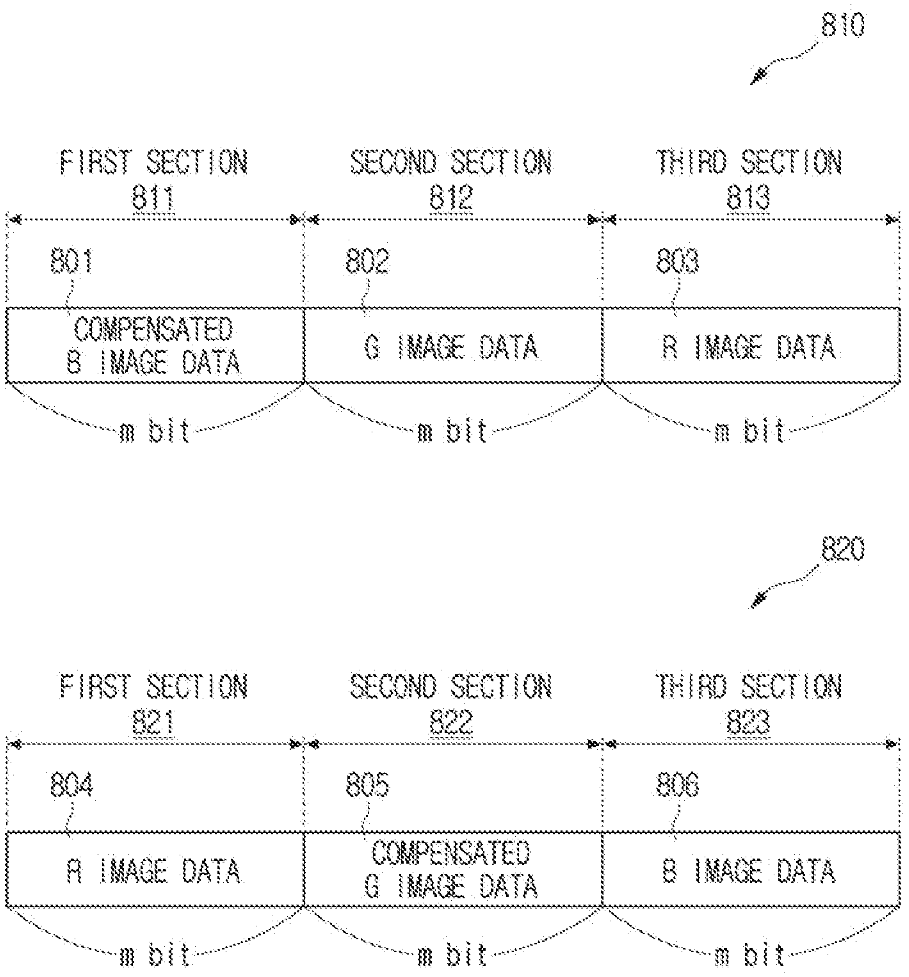

FIG. 6, FIG. 7, and FIG. 8 are diagrams illustrating RGB image data according to various embodiments.

As shown in FIG. 6, RGB image data 610 for the pixel that includes the B light emitting device from among the plurality of pixels may include B image data 601, G image data 602, and R image data 603. The B image data 601, G image data 602, and R image data 603 may each include m bit. Then, the B image data 601 may be included in a first section 611 of the RGB image data, the G image data 602 may be included in a second section 612 of the RGB image data, and the R image data 603 may be included in a third section 613 of the RGB image data.

As described above, the controller 140 may generate RGB image data having a data structure corresponding to a pre-defined protocol. The data structure of the RGB image data described above is merely one example, and the RGB image data may be generated in various formats according to protocols.

The driver 120 may obtain image data from the RGB image data, and drive a plurality of sub pixels included in a pixel by using the obtained image data.

For example, the driver 120 may obtain image data from each section of the RGB image data based on a pre-defined protocol.

Then, the driver 120 may convert the image data obtained from the first section of the RGB image data to data voltage, and drive the first driving circuit using the data voltage. Here, the first driving circuit may be a driving circuit set to receive input of data voltage corresponding to the image data obtained from the first section of the RGB image data. In this case, the first section of the RGB image data may include the B image data. Then, in the case of the pixel that includes the B light emitting device, the B light emitting device may be mounted to an electrode pad coupled to the first driving circuit (e.g., electrode pad for the B light emitting device). Accordingly, the B light emitting device may be driven based on the B image data.

In addition, the driver 120 may convert the image data obtained from the second section of the RGB image data to data voltage, and drive the second driving circuit using the data voltage. Here, the second driving circuit may be a driving circuit set to receive input of data voltage corresponding to the image data obtained from the second section of the RGB image data. In this case, the second section of the RGB image data may include the G image data. Then, in the case of the pixel that includes the B light emitting device, the G light emitting device may be mounted to an electrode pad coupled to the second driving circuit (e.g., electrode pad for the G light emitting device). Accordingly, the G light emitting device may be driven based on the G image data.

In addition, the driver 120 may convert the image data obtained from the third section of the RGB image data to data voltage, and drive the third driving circuit using the data voltage. Here, the third driving circuit may be a driving circuit set to receive input of data voltage corresponding to the image data obtained from the third section of the RGB image data. In this case, the third section of the RGB image data may include the R image data. Then, in the case of the pixel that includes the B light emitting device, the R light emitting device may be mounted to an electrode pad coupled to the third driving circuit (e.g., electrode pad for the R light emitting device). Accordingly, the R light emitting device may be driven based on the R image data.

The R light emitting device in the pixel that does not include the B light emitting device may be mounted to the electrode pad for the R light emitting device or the electrode pad for the B light emitting device.

Accordingly, when the pixel that does not include the B light emitting device is driven in a same method as the pixel that includes the B light emitting device, a problem of the R light emitting device mounted to the electrode pad for the B light emitting device being driven based on the B image data may occur.

Accordingly, the controller 140 may identify whether the type of pixel that does not include the B light emitting device is the first type or the second type based on the type information stored in the memory 130, and provide the compensated image data to the driver 120 based on the identified type.

Here, the type of pixel may be classified according to the type of electrode pad to which the R light emitting device is mounted in the pixel that does not include the B light emitting device.

For example, if the type of pixel that does not include the B light emitting device is the first type, the pixel that does not include the B light emitting device may include the R light emitting device mounted to the electrode pad for the R light emitting device. Further, if the type of pixel that does not include the B light emitting device is the second type, the pixel that does not include the B light emitting device may include the R light emitting device mounted to the electrode pad for the B light emitting device.

Specifically, the controller 140 may provide, if it is identified that the type of pixel that does not include the B light emitting device is the first type based on the type information stored in the memory 130, RGB image data for the adjacent pixel and RGB image data for the pixel that does not include the B light emitting device to the driver 120.

In this case, the first section of the RGB image data for the adjacent pixel may include compensated R image data. Further, the second section of the RGB image data for the pixel that does not include the B light emitting device may include compensated G image data.

As shown in FIG. 7, RGB image data 710 for the adjacent pixel may include compensated B image data 701, G image data 702, and R image data 702. In this case, the compensated B image data 701 may be included in a first section 711 of the RGB image data, the G image data 702 may be included in a second section 712 of the RGB image data, and the R image data 703 may be included in a third section 713 of the RGB image data.

In addition, RGB image data 720 for the pixel that does not include the B light emitting device may include B image data 704, compensated G image data 705, and R image data 706. In this case, the B image data 704 may be included in a first section 721 of the RGB image data, the compensated G image data 705 may be included in a second section 722 of the RGB image data, and the R image data 706 may be included in a third section 723 of the RGB image data.

That is, in case that the type of pixel that does not include the B light emitting device is the first type, the pixel that does not include the B light emitting device may be configured such that the G light emitting device is mounted to the electrode pad for the G light emitting device, and the R light emitting device is mounted to the electrode pad for the R light emitting device, same as with the pixel that includes the B light emitting device.

Based on the above, the controller 140 may generate RGB image data for the pixel that does not include the B light emitting device using the same method as with the pixel that includes the B light emitting device. Accordingly, the G light emitting device mounted to the electrode pad for the G light emitting device may be driven based on the compensated G image data, and the R light emitting device mounted to the electrode pad for the R light emitting device may be driven based on the R image data. The light emitting device may not be driven by the B image data obtained from the first section of the RGB image data in that the light emitting device is not mounted to the electrode pad for the B light emitting device.

The controller 140 may provide, if it is identified that the type of pixel that does not include the B light emitting device is the second type based on the type information stored in the memory 130, RGB image data for the adjacent pixel and RGB image data for the pixel that does not include the B light emitting device to the driver 120.

In this case, the first section of the RGB image data for the adjacent pixel may include the compensated B image data. Further, the first section and the second section of the RGB image data for the pixel that does not include the B light emitting device may include the R image data and the compensated G image data, respectively.

As shown in FIG. 8, RGB image data 810 for the adjacent pixel may include compensated B image data 801, G image data 802, and R image data 803. In this case, the compensated B image data 801 may be included in a first section 811 of the RGB image data, the G image data 802 may be included in a second section 812 of the RGB image data, and the R image data 803 may be included in a third section 813 of the RGB image data.

In addition, RGB image data 820 for the pixel that does not include the B light emitting device may include R image data 804, compensated G image data 805, and B image data 806. In this case, the R image data 804 may be included in a first section 821 of the RGB image data, the compensated G image data 805 may be included in a second section 822 of the RGB image data, and the B image data 806 may be included in a third section 823 of the RGB image data.

That is, if the type of pixel that does not include the B light emitting device is the second type, the pixel that does not include the B light emitting device may be configured such that the R light emitting device is mounted to the electrode pad for the B light emitting device, unlike the pixel that includes the B light emitting device.

Based on the above, the controller 140 may generate RGB image data for the pixel that does not include the B light emitting device by exchanging the B image data and the R image data. Accordingly, the G light emitting device mounted to the electrode pad for the G light emitting device may be driven based on the compensated G image data, and the R light emitting device mounted to the electrode pad for the B light emitting device may be driven based on the R image data. The light emitting device may not be driven by the B image data obtained from the third section of the RGB image data in that the light emitting device is not mounted to the electrode pad for the B light emitting device.

As described above, according to an embodiment, if the electrode pad for the B light emitting device is defective, the B light emitting device may not be mounted to the electrode pad. In this case, brightness of the B light emitting device in the pixel positioned at the surrounding of the pixel that does not include the B light emitting device may be increased. In addition, brightness of the G light emitting device in the pixel that does not include the B light emitting device may be increased in that the blue color has a similar x-axis value in color coordinates as that of the green color. Accordingly, visibility for the pixel that does not include the B light emitting device may be lowered.

In addition, if the R light emitting device is not included in the pixel, color reproducibility of the pixel may decline than when another light emitting device is not included. Accordingly, according to an embodiment, if the electrode pad for the R light emitting device is defective, the R light emitting device may be mounted to the electrode pad for the B light emitting device rather than the B light emitting device, and the pixel may be driven by exchanging the B image data and the R image data. At this time, the pixel not including the B light emitting device may be compensated through the method described above, and visibility for the pixel that does not include the B light emitting device may be lowered.

In the above-described example, increasing brightness of the B light emitting device in the adjacent pixel adjacent with the pixel that does not include the B light emitting device and brightness of the G light emitting device in the pixel that does not include the B light emitting device has been described. However, according to an embodiment, at least one of the brightness of the B light emitting device in the adjacent pixel and the brightness of the G light emitting device in the pixel that does not include the B light emitting device may be increased.

Figure 9:
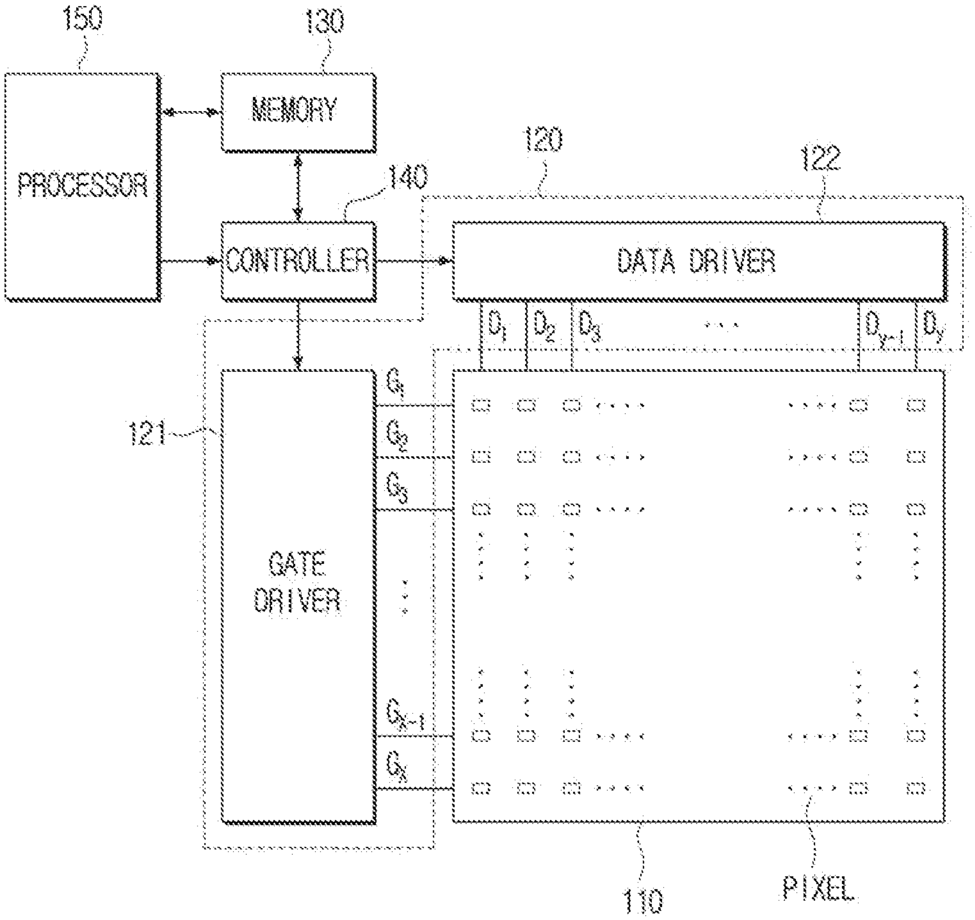
FIG. 9 is a block diagram illustrating a detailed configuration of a display apparatus according to one or more embodiments.

FIG. 9 is a block diagram illustrating a detailed configuration of a display apparatus according to one or more embodiments.

Referring to FIG. 9, the display apparatus 100 may include the display panel 110, the driver 120, the at least one memory 130, the controller 140, and at least one processor 150. However, the configurations as described are merely example configurations, and a new configuration may be added to or some configurations may be omitted from the configurations described above in realizing the disclosure. In describing FIG. 9, parts that overlap with the parts described above may be omitted.

The display panel 110 may include a plurality of pixels. The display panel 110 may be arranged with gate lines G1 to Gx and data lines D1 to Dy, and the plurality of pixels may be formed at areas at which the gate lines and the data line cross. In this case, the at least one pixel from among the plurality of pixels may not include the B light emitting device. That is, each of the at least one pixel from among the plurality of pixels may include the G light emitting device and the R light emitting device. Further, the remaining pixels may include the B light emitting device. That is, each of the remaining pixels may include the B light emitting device, the G light emitting device, and the R light emitting device.

The at least one processor 150 (hereinafter, referred to as a processor) may control the overall operation of the display apparatus 100. To this end, the processor 150 may be realized as at least one from among a central processing unit (CPU), a micro-controller, an application processor (AP), a communication processor (CP), or an ARM processor.

Specifically, the processor 150 may drive the display panel 100 by controlling the driver 120 and the controller 140.

For example, the processor 150 may provide a data signal to the controller 140. In this case, the controller 140 may control the driver 120 for an image frame to be displayed in the display panel 110 by converting the input data signal according to a data form used in the driver 120, and providing image data and various control signals to the driver 120.

The driver 120 may include a gate driver 121 and a data driver 122. The gate driver 121 and the data driver 122 may each include a driver integrated circuit (IC).

The gate driver 121 may provide a scan signal sequentially to the gate lines. Then, the data driver 122 may convert the image data to data voltage in an analog form, and apply the data voltage to the sub pixels selected by the scan signal through the data lines. That is, the data lines may be lines for applying data voltage to each sub pixel included in the display panel 110, and the gate lines may be lines for selecting the sub pixel included in the display panel 110. Accordingly, the data voltage applied through the data lines may be applied to the sub pixels selected through the gate signal.

In FIG. 9, the processor 150 and the controller 140 have been described as separate configurations, but according to one or more embodiments, only one from among the two configuration may be included in the display apparatus 1000, and the included configuration may perform functions of the remaining configuration.

Figure 10:
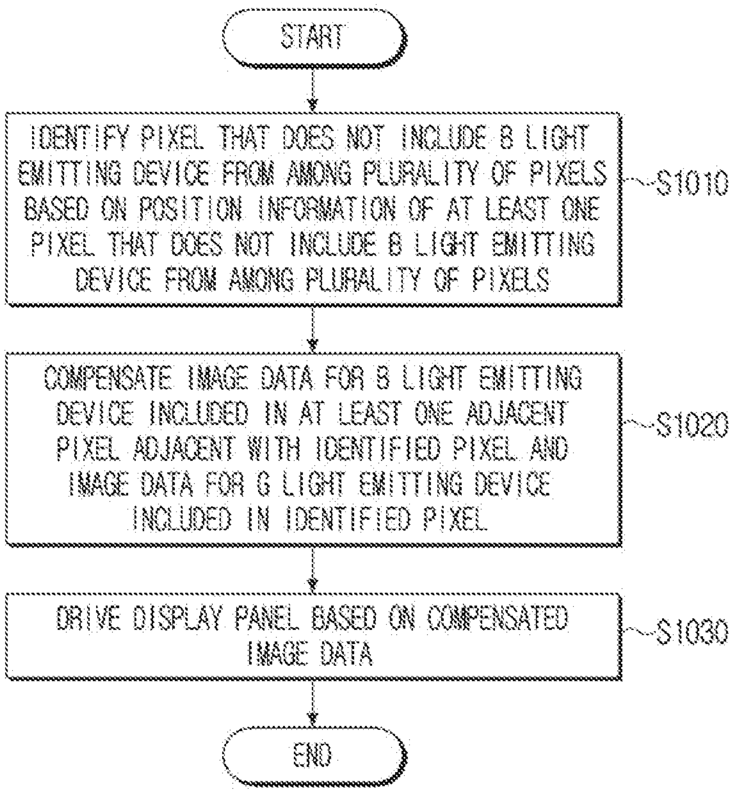
FIG. 10 is a flowchart illustrating a method of compensating image data of a display apparatus according to one or more embodiments.

FIG. 10 is a flowchart illustrating a method of compensating image data of a display apparatus according to one or more embodiments.

The display apparatus may include a display panel including a plurality of pixels.

At operation S1010, the pixel that does not include the B light emitting device from among the plurality of pixels may be identified based on position information of at least one pixel that does not include the B light emitting device from among the plurality of pixels.

At operation S1020, the image data for the B light emitting device included in at least one adjacent pixel adjacent with the identified pixel and image data for the G light emitting device included in the identified pixel may be compensated.

At operation S1030, the display panel may be driven based on the compensated image data.

Specifically, in operation S1020, image data may be compensated so that brightness of the B light emitting device included in the adjacent pixel and brightness of the G light emitting device of the identified pixel are increased.

Each of the plurality of pixels may include the electrode pad for the R light emitting device, the electrode pad for the G light emitting device, and the electrode pad for the B light emitting device.

Here, the pixel that does not include the B sub pixel may include the R light emitting device mounted to the electrode pad for the R light emitting device and the G light emitting device mounted to the electrode pad for the G light emitting device.

In addition, the pixel that does not include the B sub pixel may include the R light emitting device mounted to the electrode pad for the B light emitting device and the G light emitting device mounted to the electrode pad for the G light emitting device.

In operation S1030, the display panel may be driven based on RGB image data for driving each of the pixels. Here, B image data may be included in the first section of the RGB image data for at least one pixel that includes the B light emitting device from among the plurality of pixels, G image data may be included in the second section of the RBG image data, and R image data may be included in the third section of the RGB image data.

Specifically, in operation S1030, the type of the pixel that does not include the B light emitting device may be identified as the first type or the second type based on the type information of the pixel that does not include the B light emitting device, and the display panel may be driven using the compensated image data based on the identified type.

Here, the type of pixel may be classified according to the type of the electrode pad on which the R light emitting device is mounted from the pixel that does not include the B light emitting device.

Specifically, in operation S1030, if the type of pixel that does not include the B light emitting device is identified as the first type based on the type information, the display panel may be driven based on the RGB image data for the adjacent pixel and the RGB image data for the pixel that does not include the B light emitting device.

Here, if the type of pixel that does not include the B light emitting device is the first type, the pixel that does not include the B light emitting device may include the R light emitting device mounted to the electrode pad for the R light emitting device. Further, the first section of the RGB image data for the adjacent pixel may include the compensated R image data, and the second section of the RGB image data for the pixel that does not include the B light emitting device may include the compensated G image data.

In addition, in operation S1030, if the type of pixel that does not include the B light emitting device is identified as the second type based on the type information, the display panel may be driven based on the RGB image data for the adjacent pixel and the RGB image data for the pixel that does not include the B light emitting device.

Here, if the type of pixel that does not include the B light emitting device is the second type, the pixel that does not include the B light emitting device may include the R light emitting device mounted to the electrode pad for the B light emitting device. Further, the first section of the RGB image data for the adjacent pixel may include the compensated B image data, and the first section and the second section of the RGB image data for the pixel that does not include the B light emitting device may each include the R image data and the compensated G image data.

A method according to the example embodiments of the disclosure may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™) or directly between two user devices (e.g., smartphones). In the case of online distribution, at least a portion of the computer program product (e.g., downloadable app) may be stored at least temporarily in the storage medium readable by a device such as a server of a manufacturer, a server of an application store, or a memory of a relay server, or temporarily generated.

Each of the elements (e.g., a module or a program) according to various embodiments of the disclosure as described in the above may be formed as a single entity or a plurality of entities, and some sub-elements of the above-mentioned sub-elements may be omitted, or other sub-elements may be further included in the various embodiments. Alternatively or additionally, some elements (e.g., modules or programs) may be integrated into one entity to perform the same or similar functions performed by the respective elements prior to integration.

Operations performed by a module, a program, or another element, in accordance with the various embodiments, may be executed sequentially, in a parallel, repetitively, or in a heuristic manner, or at least some operations may be executed in a different order, omitted or a different operation may be added.

The term "part" or "module" used in the disclosure may include a unit formed as a hardware, software, or firmware, and may be used interchangeably with terms such as, for example, and without limitation, logic, logic blocks, components, circuits, or the like. "Part" or "module" may be a component integrally formed or a minimum unit or a part of the component performing one or more functions. For example, a module may be formed as an application-specific integrated circuit (ASIC).

A non-transitory computer readable medium stored with a program that sequentially performs a control method according to the disclosure may be provided. The non-transitory computer readable medium may refer to a medium that stores data semi-permanently rather than storing data for a very short time, such as a register, a cache, and a memory, and is readable by a device. Specifically, the various applications or programs described above may be stored and provided in the non-transitory computer-readable medium such as, for example, and without limitation, a compact disc (CD), a digital versatile disc (DVD), a hard disc, a Blu-ray disc, a universal serial bus (USB), a memory card, a read only memory (ROM), and the like.

One or more embodiments may be realized with software including instructions stored in a machine-readable storage media (e.g., computer). The machine may call an instruction stored in the storage medium, and as a device operable according to the called instruction, may include an electronic apparatus according to the above-mentioned embodiments.

Based on the instruction being executed by the processor, the processor may directly or using other elements under the control of the processor perform a function corresponding to the instruction. The instruction may include a code generated by a compiler or executed by an interpreter.

While the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. A display apparatus comprising:

a display panel comprising a plurality of pixels;

a driver configured to drive the plurality of pixels based on image data;

a controller configured to provide the image data to the driver, to display an image frame on the display panel;

at least one memory configured to store position information of at least one pixel, from among the plurality of pixels, that does not comprise a blue (B) light emitting device, and store at least one instruction; and at least one processor configured to execute the at least one instruction to:

identify, through the controller, a pixel in which a B light emitting device is not mounted to an electrode pad for the B light emitting device, from among the plurality of pixels, based on the position information stored in the memory, identify, through the controller, a type of the identified pixel based on whether a red (R) light emitting device of the identified pixel is mounted to the electrode pad for the B light emitting device or to an electrode pad for the R light emitting device, generate, through the controller and based on the type of the identified pixel, compensated image data for a B light emitting device in at least one adjacent pixel from among the plurality of pixels, that is adjacent with the identified pixel, and for a green (G) light emitting device in the identified pixel, and provide, through the controller, the compensated image data to the driver.

2. The display apparatus of claim 1, wherein the at least one processor is further configured to execute the at least one instruction to:

generate the compensated image data such that a brightness of the B light emitting device in the at least one adjacent pixel, and a brightness of the G light emitting device in the identified pixel are increased.

3. The display apparatus of claim 1, wherein each of the plurality of pixels comprises an electrode pad for a red (R) light emitting device, an electrode pad for a G light emitting device, and an electrode pad for a B light emitting device.

4. The display apparatus of claim 3, wherein the identified pixel that does not comprise the B light emitting device mounted to the electrode pad for the B light emitting device comprises the R light emitting device mounted to the electrode pad for the R light emitting device and the G light emitting device mounted to the electrode pad for the G light emitting device.

5. The display apparatus of claim 3, wherein the identified pixel that does not comprise the B light emitting device mounted to the electrode pad for the B light emitting device comprises the R light emitting device mounted to the electrode pad for the B light emitting device and the G light emitting device mounted to the electrode pad for the G light emitting device.

6. The display apparatus of claim 3, wherein the controller is further configured to provide RGB image data to the driver for driving each of the plurality of pixels, the RGB image data for driving at least one pixel that comprises the B light emitting device, from among the plurality of pixels, comprising B image data in a first section, G image data in a second section, and R image data in a third section.

7. The display apparatus of claim 6, wherein the memory is configured to store type information of a pixel, and the at least one processor is further configured to execute the at least one instruction to:

identify, through the controller and based on the type information stored in the memory, whether the type of the identified pixel a first type in which the R light emitting device is mounted on the electrode pad for the R light emitting device or a second type in which the R light emitting device is mounted on the electrode pad for the B light emitting device, and provide, through the controller, the compensated image data to the driver based on the identified type of the identified pixel.

8. The display apparatus of claim 7, wherein the at least one processor is further configured to execute the at least one instruction to:

based on identifying the type of the identified pixel that does not comprise the B light emitting device mounted to the electrode pad for the B light emitting device as the first type, provide the RGB image data to the driver for driving the at least one adjacent pixel and the identified pixel, and determine that the identified pixel comprises the R light emitting device mounted to the electrode pad for the R light emitting device, the RGB image data for driving the at least one adjacent pixel comprising compensated R image data in a first section, and the RGB image data for driving the identified pixel comprising compensated G image data in a second section.

9. The display apparatus of claim 7, wherein the at least one processor is further configured to execute the at least one instruction to:

based on identifying the type of the identified pixel that does not comprise the B light emitting device mounted to the electrode pad for the B light emitting device as the second type, provide the RGB image data to the driver for driving the at least one adjacent pixel and the identified pixel, and determine that the identified pixel comprises the R light emitting device mounted to the electrode pad for the B light emitting device, the RGB image data for driving the at least one adjacent pixel comprising compensated B image data in a first section, and the RGB image data for driving the identified pixel comprising R image data in a first section and compensated G image data in a second section.

10. An image displaying method of a display apparatus which comprises a display panel comprising a plurality of pixels, the method comprising:

identifying a pixel in which a B light emitting device is not mounted to an electrode pad for the B light emitting device, from among the plurality of pixels, based on position information of the identified pixel;

identifying a type of the identified pixel based on whether a red (R) light emitting device of the identified pixel is mounted to the electrode pad for the B light emitting device or to an electrode pad for the R light emitting device generating, based on the type of the identified pixel, compensated image data for a blue (B) light emitting device in at least one adjacent pixel from among the plurality of pixels, that is adjacent with the identified pixel, and image data for a green (G) light emitting device in the identified pixel; and driving the plurality of pixels based on the compensated image data.

11. The method of claim 10, wherein the generating the compensated image data comprises:

increasing a brightness of the B light emitting device in the at least one adjacent pixel, and increasing a brightness of the G light emitting device in the identified pixel.

12. The method of claim 10, wherein each of the plurality of pixels comprises an electrode pad for a red (R) light emitting device, an electrode pad for a G light emitting device, and an electrode pad for a B light emitting device.

13. The method of claim 12, wherein the identified pixel that does not comprise the B light emitting device mounted to the electrode pad for the B light emitting device comprises the R light emitting device mounted to the electrode pad for the R light emitting device, and the G light emitting device mounted to the electrode pad for the G light emitting device.

14. The method of claim 12, wherein the identified pixel that does not comprise the B light emitting device mounted to the electrode pad for the B light emitting device comprises the R light emitting device mounted to the electrode pad for the B light emitting device and the G light emitting device mounted to the electrode pad for the G light emitting device.

15. The method of claim 12, wherein the driving the plurality of pixels based on the compensated image data comprises:

driving the plurality of pixels based on RGB image data, the RGB image data for driving at least one pixel that comprises the B light emitting device, from among the plurality of pixels, comprising B image data in a first section, G image data in a second section, and R image data in a third section.

16. The method of claim 15, further comprising:

identifying the type of the identified pixel as a first type in which the R light emitting device is mounted on an electrode pad for the R light emitting device or a second type in which the R light emitting device is mounted on an electrode pad for the B light emitting device; and driving the plurality of pixels based on the compensated image data comprises driving the plurality of pixels based on the identified type of the identified pixel.

17. The method of claim 16, further comprising:

based on identifying the identified pixel that does not comprise the B light emitting device mounted to the electrode pad for the B light emitting device as the first type, driving the at least one adjacent pixel and the identified pixel based on the RGB image data, and determining that the R light emitting device in the identified pixel is mounted to the electrode pad for the R light emitting device, the RGB image data for driving the at least one adjacent pixel comprising compensated R image data in a first section, and the RGB image data for driving the identified pixel comprising compensated G image data in a second section.

18. The method of claim 16, further comprising:

based on identifying the identified pixel that does not comprise the B light emitting device mounted to the electrode pad for the B light emitting device as the second type, driving the at least one adjacent pixel and the identified pixel based on the RGB image data, and determining that the R light emitting device in the identified pixel is mounted to the electrode pad for the B light emitting device, the RGB image data for driving the at least one adjacent pixel comprising compensated B image data in a first section, and the RGB image data for driving the identified pixel comprising R image data in a first section and compensated G image data in a second section.

19. A non-transitory computer readable medium for storing computer readable program code or instructions which are executable by a processor to perform a method of a display apparatus which comprises a display panel comprising a plurality of pixels, the method comprising:

identifying a pixel in which a B light emitting device is not mounted to an electrode pad for the B light emitting device, from among the plurality of pixels, based on position information of the identified pixel;

identifying a type of the identified pixel based on whether a red (R) light emitting device of the identified pixel is mounted to the electrode pad for the B light emitting device or to an electrode pad for the R light emitting device;

generating, based on the type of the identified pixel, compensated image data for a blue (B) light emitting device in at least one adjacent pixel from among the plurality of pixels, that is adjacent with the identified pixel, and image data for a green (G) light emitting device in the identified pixel; and driving the plurality of pixels based on the compensated image data.

20. The non-transitory computer readable medium of claim 19, wherein the method further comprises:

identifying the type of the identified pixel as a first type based on the R light emitting device being mounted on an electrode pad for the R light emitting device or a second type based on the R light emitting device being mounted on an electrode pad for the B light emitting device; and driving the plurality of pixels based on the compensated image data and the identified type of the identified pixel.

* * * * *